United States Patent
Theis et al.

(10) Patent No.: US 8,745,995 B2
(45) Date of Patent: Jun. 10, 2014

(54) PROCESS FOR HEAT INTEGRATION BY MEANS OF A REFRIGERATION SYSTEM

(75) Inventors: Gerhard Theis, Maxdorf (DE); Thomas Borren, Shanghai (CN); Jörg Schlecht, Gerolsheim (DE); Frans Vansant, Kalmthout (BE)

(73) Assignee: BASF SE, Ludwigshafen (DE)

( * ) Notice: Subject to any disclaimer, the term of this patent is extended or adjusted under 35 U.S.C. 154(b) by 165 days.

(21) Appl. No.: 13/268,266

(22) Filed: Oct. 7, 2011

(65) Prior Publication Data

US 2012/0085106 A1 Apr. 12, 2012

Related U.S. Application Data

(60) Provisional application No. 61/390,624, filed on Oct. 7, 2010.

(51) Int. Cl.
*F25B 7/00* (2006.01)

(52) U.S. Cl.
USPC ................................. 62/79; 62/104

(58) Field of Classification Search
USPC ................ 62/79, 101, 238.1, 238.3, 476, 480
See application file for complete search history.

(56) References Cited

U.S. PATENT DOCUMENTS

| 4,530,826 | A | | 7/1985 | Ohashi et al. |
| 5,347,828 | A | * | 9/1994 | Kesten ........................... 62/46.2 |
| 5,768,904 | A | | 6/1998 | Tagamolila et al. |
| 5,953,927 | A | | 9/1999 | Tagamolila et al. |
| 6,523,357 | B1 | | 2/2003 | Katayama |
| 2007/0169492 | A1 | * | 7/2007 | Geel et al. ..................... 62/238.3 |

FOREIGN PATENT DOCUMENTS

| EP | 1 391 665 A2 | 2/2004 |
| EP | 1 391 665 A3 | 2/2004 |
| JP | 2004-233024 | 8/2004 |
| WO | WO 2008/034798 A1 | 3/2008 |

OTHER PUBLICATIONS

International Search Report and Written Opinion issued Nov. 4, 2011 in patent application No. PCT/EP2011/067246 filed Oct. 4, 2011 with English translation of Category of Cited Documents.

* cited by examiner

*Primary Examiner* — Melvin Jones
(74) *Attorney, Agent, or Firm* — Oblon, Spivak, McClelland, Maier & Neustadt, L.L.P.

(57) ABSTRACT

A process for heat integration in engineering processes is provided in which, in a heat carrier circuit, a heat carrier medium takes up heat from a first process stream in a first heat exchanger and releases it to a refrigeration system. In a refrigerant circuit, a refrigerant is cooled in the refrigeration system and the refrigerant takes up heat from a second process stream in a second heat exchanger or a second process stream is cooled in the refrigeration system. The first process stream is a vapor stream from a thermal separation apparatus, and the temperature of the heat carrier medium is increased by heat supply between egress from the first heat exchanger and ingress into the refrigeration system.

16 Claims, 4 Drawing Sheets

PROCESS FOR HEAT INTEGRATION BY MEANS OF A REFRIGERATION SYSTEM

BACKGROUND OF THE INVENTION

1. Field of the Invention

The invention relates to a process for heat integration in engineering processes in which, in a heat carrier circuit, a heat carrier medium takes up heat from a first process stream in a first heat exchanger and releases it to a refrigeration system, and in addition a second process stream is cooled using the refrigeration system.

2. Description of the Related Art

Against the background of increasing demands with respect to energy efficiency and cost efficiency, heat integration is increasingly gaining importance in engineering processes. Different variants of heat integration are known in the specialist area and some have established themselves in large scale industrial plants. Customarily, in this case, temperature differences between process streams are exploited, for example when a hot stream from a reactor is used in order to heat up the cooler feed to the reactor. In cases where the temperature difference between the streams is too small in order to implement a direct heat exchange, frequently refrigeration systems or heat pumps are used in order to make the heat usable at the corresponding temperature levels. In addition to steam jet or compression refrigeration systems, here, in particular, absorption refrigeration systems or absorption heat pumps may be mentioned.

In an absorption refrigeration machine the absorption capacity of a selected material pair comprising a refrigerant and an absorbent is utilized (see, e.g. "Dubbel Taschenbuch für den Maschinenbau" [Dubbel's handbook of mechanical engineering], 21st edition, Verlag Springer, Berlin, 2005, section M 1.4.3). In this machine the refrigerant vaporizes at low pressure in an evaporator and thereby removes heat from a process stream at a low temperature level. The resultant refrigerant vapor is absorbed by the absorbent with removal of heat in an absorber. The refrigerant-enriched absorbent is pumped to a higher pressure level into an expeller in which, with supply of heat from a process stream at a higher temperature level, the refrigerant is expelled again. The depleted absorbent is recirculated back to the absorber. The refrigerant vapor is liquefied at the higher pressure level in a condenser using cooling water and fed back to the evaporator. In the industrial sector, in particular for applications at low temperatures, the material pair ammonia as refrigerant and water as absorbent has proven itself. In addition, the material pair water as refrigerant and lithium bromide as absorbent has become established.

U.S. Pat. No. 4,530,826 describes a possibility of using waste heat in an engineering process, which waste heat is available at a relatively low temperature level. In this case product streams from distillation, absorption or desorption columns and also from reactors are used, in order to remove or supply heat from or to other streams at different locations of the respective engineering process by means of an absorption refrigeration system or an absorption heat pump. The principle is illustrated by way of example by processes for producing acrylonitrile, methacrylic acid, acrylic acid, prussic acid and formaldehyde.

In the PCT application WO 2008/034798 A1, a process is described for generating refrigeration energy in a polycondensation process in which wastewater vapor formed as a byproduct is converted by condensation into wastewater. The heat energy liberated during condensation of the wastewater vapor is taken up by a heat carrier medium and fed to a refrigeration generator having a thermal compressor and converted into refrigeration energy. The refrigeration energy can be used for cooling a process medium or else for conditioning air in an air conditioning appliance.

Although refrigeration systems and heat pumps are already used in numerous engineering systems for heat integration, there is still a requirement for improving the technology, especially with respect to even broader usability.

BRIEF SUMMARY OF THE INVENTION

The object of the invention described hereinafter was to develop known technologies of heat integration in such a manner that they are suitable for a broader field of use.

For achieving this object, a process for heat integration in engineering processes is proposed, in which, in a heat carrier circuit, a heat carrier medium takes up heat from a first process stream in a first heat exchanger and releases it to a refrigeration system, in addition in a refrigerant circuit a refrigerant is cooled in the refrigeration system and the refrigerant takes up heat from a second process stream in a second heat exchanger or a second process stream is cooled in the refrigeration system, wherein the temperature of the heat carrier medium is increased by heat supply between egress from the first heat exchanger and ingress into the refrigeration system.

The process according to the invention serves for transferring heat between two or more process streams of a processing plant, that is to say to couple them thermally. The type of the process streams with respect to their composition is of no importance in this case since only their respective temperature levels have an effect on the process. According to the invention, the temperature of the first process stream at the site of the heat transfer to the heat carrier medium is higher than the temperature of the second process stream at the site thereof of the heat transfer to the cooling medium.

Heat is withdrawn from the first process stream in a first heat exchanger and transferred to a heat carrier medium. As heat carrier medium, various substances are available to those skilled in the art from which they can select a suitable medium according to demand, for example water, mixtures of water and organic substances such as ethylene glycol, mineral oils or synthetic heat carrier media. The heat carrier medium can be liquid, vaporous or multiphase, preferably liquid. In a further preferred embodiment, the heat carrier medium is water in the liquid phase.

For design of the first heat exchanger, differing variants come into consideration, e.g. cocurrent, countercurrent or crosscurrent flow heat exchangers. They can be selected and dimensioned according to the sector of use and also amount and temperature level of the heat to be transferred. A heat exchanger having a countercurrent flow of heat carrier medium and a first process stream has proven advantageous, since in this case comparatively higher temperatures of the heat carrier medium can be achieved from the exit of the heat exchanger.

The heat carrier medium flows in a circuit through the first heat exchanger where it takes up heat from the first process stream and a refrigeration system to which the heat carrier medium gives off heat. According to the invention, the temperature of the heat carrier medium between egress from the first heat exchanger and ingress into the refrigeration system is increased by heat supply. This heat can be supplied in various ways.

In a first preferred embodiment of the process according to the invention, the heat is supplied via an additional heat exchanger. As additional heat exchanger, all known types come into consideration that those skilled in the art can select and dimension on the basis of the amount of heat to be transferred to the heat carrier medium, the temperature level and the auxiliary energies available.

In a second preferred embodiment of the process according to the invention, the heat is supplied by a liquid or vaporous heating medium being fed into the heat carrier circuit. The heating medium is preferably a substance that is also present in the heat carrier medium. Particularly preferably, hot water or steam is used as heating medium when the heat carrier medium substantially comprises water. In order to keep the amount of heat carrier medium circulating at least approximately constant, a stream of heat carrier medium and heating medium can be ejected upstream of ingress into the refrigeration system or downstream of egress from the refrigeration system. Preferably, the ejection proceeds downstream of egress from the refrigeration system, since in this case, owing to the higher flow rate, additional energy is available for operating the refrigeration system.

The refrigeration system is used in order to withdraw heat from a second process stream. In an embodiment according to the invention this is achieved by the second process stream being cooled in the refrigeration system. For this purpose it is brought into contact with the corresponding heat-transferring unit of the refrigeration system. In a further embodiment according to the invention, heat is withdrawn from the second process stream by means of a cooling medium. Preferably, the cooling medium is conducted in a circuit in which it takes up heat from the second process stream in a second heat exchanger, flows to the refrigeration system, there gives off heat to the refrigeration system and flows back to the second heat exchanger.

Also in the case of the cooling medium, those skilled in the art can select from various substances according to what demands there are, for example, with respect to the amount of heat to be transferred or the temperature level. In a preferred embodiment, the cooling medium is water.

For the second heat exchanger also, differing design variants come into consideration, e.g. cocurrent, countercurrent or crosscurrent flow heat exchangers which can be selected and dimensioned according to the field of use and requirements with respect to the amount of heat to be transferred. Preference is given to a heat exchanger having a countercurrent flow of cooling medium and second process stream, since in this case the refrigeration energy can be exploited particularly efficiently.

The refrigeration system in the process according to the invention can be designed in various ways. Suitable embodiments are known to those skilled in the art. Preferably, as refrigeration system, an absorption refrigeration system is used as is described, for example, in "Dubbel Taschenbuch für den Maschinenbau, 21st edition, Verlag Springer, Berlin, 2005", section M 1.4.3.

The expressions "first" and "second" process stream or heat exchanger are used here and hereinafter for differentiating between process streams at differing temperature levels. They should not be interpreted strictly in the singular. The invention also comprises arrangements in which the heat carrier medium exchanges heat with two or more "first process streams". Likewise, arrangements are comprised in which two or more "second process streams" are cooled in the refrigeration system or by means of a cooling medium circuit.

The site of the heat transfer from a first process stream to the heat carrier medium and the site of the heat exchange of the cooling medium with a second process stream can be closely adjacent to one another, for example in the case of the overhead takeoff from a column as a first process stream and of a side takeoff or bottom takeoff from the same column as a second process stream. However, they can also be more remote from one another in an engineering process, e.g. if the streams are assigned to differing apparatuses. A limit is set to the distance of the sites from one another only from practical and economical aspects, since in the case of far-distant sites, long lines for heat transfer medium or cooling medium are required which are associated with corresponding costs, inter alia for sufficient insulation.

In a preferred embodiment, the temperature of the heat transfer medium is controlled to a preset value as a control variable upstream of the entry into the refrigeration system, by controlled variables of the additional heat exchanger or of the heating medium fed being influenced in a suitable manner. In a further preferred embodiment, instead of the temperature upstream of entry, the temperature of the heat carrier medium downstream of the exit from the refrigeration system is controlled as a control variable. The temperature of the heat carrier medium at the entry into the refrigeration system and the temperature at the exit from the refrigeration system are relevant as control variables to the performance of the refrigeration system and to the amount of heat which can be withdrawn from the second process stream. For the control variable, a theoretical value can be preset, wherein a controller ensures by manipulating one or more controlled variables that the temperature actually measured approximates its theoretical value. If an additional heat exchanger is present in the process according to the invention, the output of the additional heat exchanger is, for example, a suitable controlled variable for controlling the temperature upstream or downstream of the refrigeration system. If, in contrast, a heating medium is used for heat supply, the amount of heating medium supplied can advantageously be used as controlled variable.

In a preferred embodiment of the process according to the invention, the first process stream is the vapor stream from a thermal separation apparatus. Examples of thermal separation apparatuses having suitable vapor streams are distillation columns or desorption columns. In a further preferred embodiment, the first process stream is the product stream from a reactor in which, e.g. owing to an exothermic reaction, the product stream was heated and must be cooled before a further process stage. Frequently, the first process stream is gaseous and is converted at least in part into one or more liquid phases for further processing. The condensation required for this purpose can advantageously be carried out in a first heat exchanger in the context of the process according to the invention. Other heat exchangers can also further be present, for example an air or cooling water condenser.

Particularly advantageously, the process according to the invention may be employed to the connection of a desorption column to an absorption column, wherein the first process stream is an overhead stream from a desorption column, and the second process stream is a stream which is removed from the desorption column and supplied to the absorption column. Such a connection will be described in more detail in the example hereinafter.

By increasing the temperature at the entrance of the refrigeration system, the performance of the refrigeration system is increased, and thereby the amount of heat which can be withdrawn from a second process stream is increased. Small temperature differences between first and second process streams can also expediently be utilized economically that have remained unutilized to date. The additionally required heat that is supplied via an additional heat exchanger or a heating medium is frequently in any case available in engineering plants, and so the benefit from the process according to the invention outweighs this increased use of energy.

BRIEF DESCRIPTION OF THE SEVERAL VIEWS OF THE DRAWINGS

The invention will be described in more detail hereinafter with reference to the drawings, wherein the drawings are to be understood as outline depictions. They do not represent a restriction of the invention, for example with respect to specific design variants. In the drawings.

DETAILED DESCRIPTION OF THE INVENTION

Figure 1:
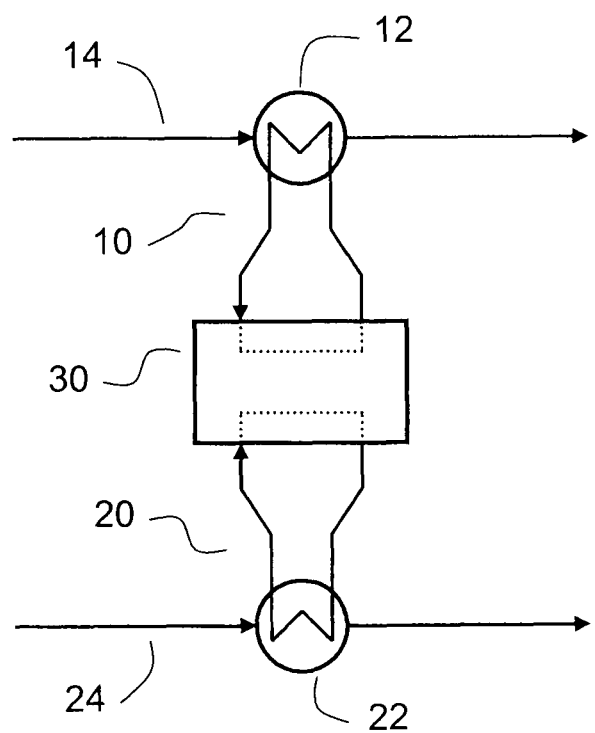
FIG. 1: shows an outline sketch of an arrangement for heat integration according to the prior art

FIG. 1 shows an outline sketch of an arrangement for heat integration according to the prior art. A first process stream 14, in a first heat exchanger 12 at a relatively high temperature level, gives off heat to a heat carrier medium. The heat carrier medium flows through a refrigeration system 30 where it itself gives off heat to the refrigeration system 30. The heat carrier circuit 10 is closed by feeding the cooled heat carrier medium back to the first heat exchanger 12. At a lower temperature level, a cooling medium picks up heat from a second process stream 24 in a second heat exchanger 22. The warmed cooling medium flows in a cooling medium circuit 20 through the refrigeration system 30, where it is cooled and flows back to the second heat exchanger.

Figure 2:
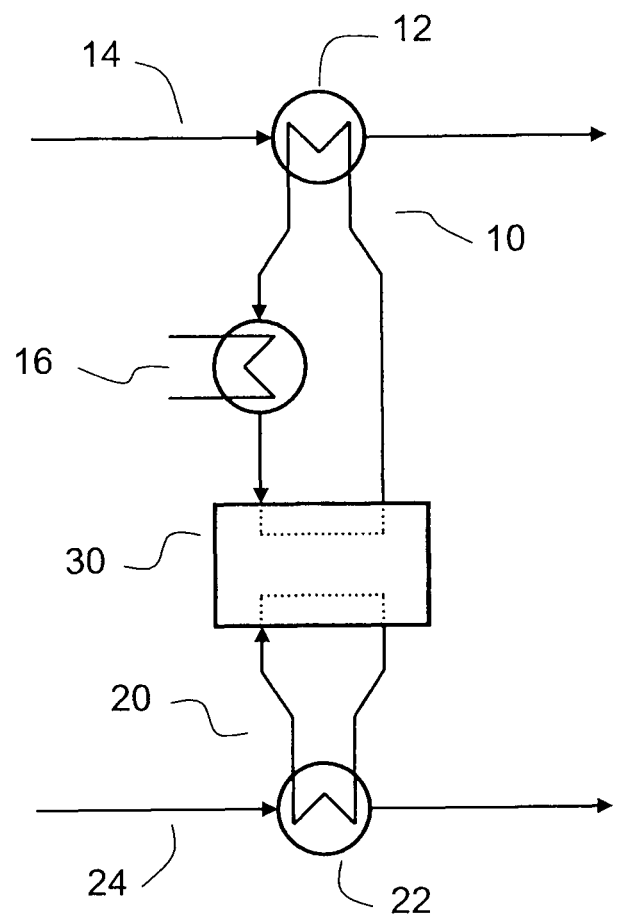
FIG. 2: shows an outline sketch of an arrangement according to the invention for heat integration with an additional heat exchanger

In FIG. 2 an outline sketch of a first implementation of the process according to the invention is shown. The known configuration as per FIG. 1 is extended to the extent that the heat carrier medium, after the exit from the first heat exchanger 12, is conducted through an additional heat exchanger 16 in which heat is fed thereto before it enters into the refrigeration system 30. Preferably, the temperature of the first process stream 14 is in a range from 85° C. to 130° C. on entry into the first heat exchanger 12. In this first heat exchanger 12, the heat carrier medium is warmed, preferably by 1° C. to 20° C., particularly preferably by 5° C. to 15° C. The temperature of the heat carrier medium at the exit from the first heat exchanger 12 is preferably from 80° C. to 120° C. The temperature of the cooling medium on entry into the second heat exchanger 22 is preferably in a range from 5° C. to 25° C. In the second heat exchanger 22, the cooling medium is preferably warmed by 2° C. to 15° C.

Figure 3:
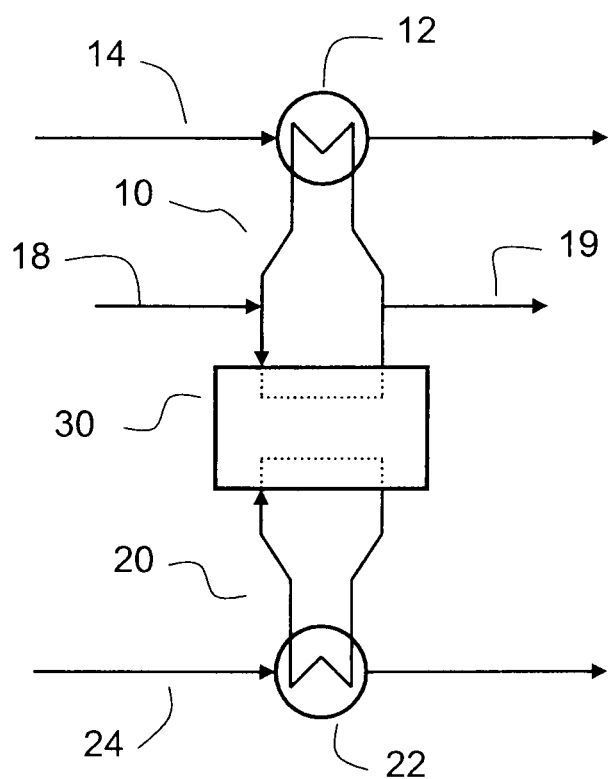
FIG. 3: shows an outline sketch of an arrangement according to the invention for heat integration with supply of a heating medium

FIG. 3 shows an outline sketch of a second implementation of the process according to the invention. The temperature increase of the heat carrier medium on its path from the exit from the first heat exchanger 12 to entry into the refrigeration system 30 is effected by feeding a heating medium 18 into the heat carrier medium. Preferably, the heating medium 18 is fed into the heat carrier circuit 10 via a mixing nozzle by means of a temperature controller. In order to prevent accumulation of heat carrier medium and heating medium in the heat carrier circuit 10, preferably after exit from the refrigeration system 30, an ejection proceeds, in FIG. 3 shown as stream 19. In an advantageous design the ejection proceeds by means of a level controller in a compensating vessel.

The temperature increase of the heat carrier medium via the additional heat exchanger 16 or by feeding in the heating medium is preferably from 0.5° C. to 10° C., particularly preferably from 1° C. to 5° C.

EXAMPLE

Figure 4:
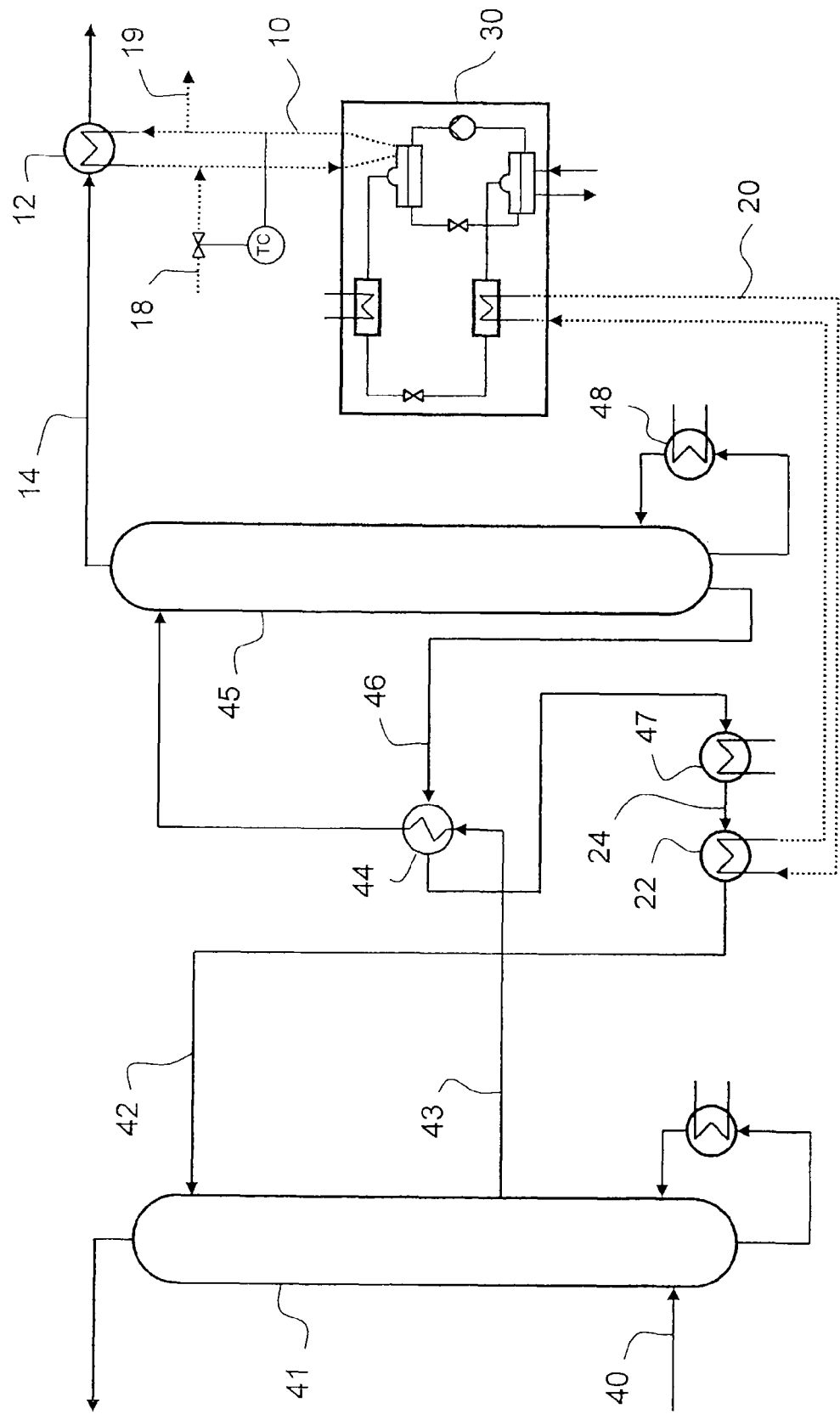
FIG. 4: detail from the process diagram of a process for producing ethylene oxide.

Ethylene oxide (EO) is produced on a large industrial scale by direct oxidation of ethylene with air or oxygen in the presence of silver catalysts. In this process ethylene and oxygen are charged in a recycle gas stream which, in addition to the reactants, contains inert gases and the byproduct of ethylene total oxidation, carbon dioxide. Such processes are described, for example, in Ullmann's Encyclopedia of Industrial Chemistry, Seventh Edition. FIG. 4 shows in simplified form a detail from the process chart, in which the process according to the invention is used. The pressures indicated hereinafter relate to the absolute pressure.

The cooled gaseous reaction product 40 exiting from the reactor is fed to an absorption column 41. There, the reaction product is conducted at a pressure of 12 to 18 bar in the countercurrent flow to a scrubbing liquid 42, wherein the valuable product EO and also other low boilers transfer by absorption into the scrubbing liquid. The loaded scrubbing liquid is removed from the absorption column 41 via a side takeoff 43, preheated in a heat exchanger 44 and fed to a desorption column 45. There, it is regenerated with steam at a temperature of 100 to 150° C. and a pressure of 1 to 4 bar. The EO-enriched vapor stream 14 is taken off overhead of the desorption column 45 and, after separating off dissolved low boilers, is fed to a purifying distillation or a plant for obtaining ethylene glycol. In the bottom takeoff 46 of the desorption column 45, the unloaded scrubbing liquid is taken off, cooled in a multiplicity of heat exchangers 44, 47 and 22 to a temperature in the region of from 15 to 30° C., preferably in the region of from 18 to 22° C., and recirculated back to the absorption column 41.

The scrubbing liquid is cooled in a multistage manner in this example. A fraction of the cooling power required for cooling the scrubbing liquid is applied via heat exchange with the loaded scrubbing liquid in the feed to the desorption column in the heat exchanger 44. The scrubbing liquid is then conducted through a heat exchanger 47 operated with cooling water. At maximum cooling power, the temperature at the exit from this heat exchanger 47 substantially corresponds to the temperature of the cooling water. Examples of cooling water are river water, sea water, brackish water, or else water from close-circuit coolers or cooling towers. With respect to the cooling water temperature available, there are not only regional but also seasonal differences. In central Europe, for example, the temperature of river water can vary from approximately 5° C. in the winter to approximately 25° C. in the summer.

After exit from the heat exchanger 47 operated with cooling water, the scrubbing liquid is cooled further if required in a heat exchanger 22 operated with cold water. If, for example, the scrubbing liquid should be fed to the absorption column at 15° C. and the temperature of the cooling water is 20° C., the cold water heat exchanger 22 takes over the cooling of the scrubbing liquid from approximately 20° C. at the exit from the cooling water heat exchanger 47 to the required 15° C. In order to achieve this, the cold water must be made available at less than 15° C. Customarily, for generating the necessary cold water, steam jet refrigeration plants or compression refrigeration plants are used. In this case large amounts of heating steam or electrical energy must be applied for generating the refrigeration power. This energy expenditure can be significantly reduced by using the process according to the invention.

If cooling water is available at a relatively low temperature, for example at 5 to 10° C. in the winter months, operating the cold water heat exchanger 22 can be dispensed with. However, in such situations it can also be advantageous to operate the cold water heat exchanger 22, for example if a maximally permitted temperature difference on the cooling water side is stipulated for the cooling water heat exchanger 47 and this would be exceeded if the scrubbing liquid were cooled to the desired recycle temperature completely in this heat exchanger 47.

The cold water for the heat exchanger 22 is provided in a cooling medium circuit 20 by a cooling system 30 at a temperature of 10 to 25° C., which is constructed in this example as an absorption refrigeration system. The energy required for operating the refrigeration system 30 is withdrawn from a heat exchanger 12 which is provided in order to condense in part the vapor stream 14 having a temperature of 105 to 125° C. from the desorption column 45. In a heat carrier circuit 10 water flows with a temperature of 80 to 100° C. from the refrigeration system 30 to the heat exchanger 12 and there takes up heat from the vapor stream 14. The warmed water with a temperature of 85 to 120° C. flows back to the refrigeration system 30 and itself gives off heat to the expeller of the refrigeration system 30.

For increasing the refrigeration power of the refrigeration system 30, steam is fed as heating medium 18 to the water as heat carrier medium between the exit from the heat exchanger 12 and the entry into the refrigeration system 30. In this case the temperature of the heat carrier medium is measured at the exit from the refrigeration system 30 and a preset theoretical value is controlled by varying the amount of heating medium 18 that is supplied. After exit from the refrigeration system 30, some of the heat carrier medium is ejected via stream 19 and fed to the condensate system in order to avoid accumulation of the heat carrier medium in the heat carrier circuit 10.

By increasing the temperature of the heat carrier medium into the refrigeration system 30 from 92° C. to 97° C., for example, the refrigeration power of the absorption refrigeration system can be increased by approximately 15% at an identical temperature of the cooling medium on entry into the refrigeration system and at the same temperature level in the brine circuit in the refrigeration system.

In addition to increasing the refrigeration power, feeding heat further achieves that the amount of heat introduced into the refrigeration system is substantially independent of any variations occurring in the vapor stream 14 with respect to flow rate or temperature. This causes a more uniform provision of the refrigeration energy for the heat exchanger 12 and makes the plant component less sensitive to fluctuations or faults.

In order to achieve a procedure of the process shown in FIG. 4, which procedure is optimized with respect to the energy consumption, the control strategy described hereinafter can be implemented, preferably in the form of a model-supported control. At at least three points in the desorption column 45, measured values of the temperature are recorded and the temperature course in the column determined therefrom. The steam input into the evaporator 48 of the desorption column 45 is adapted in such a manner that the ethylene oxide loading of the scrubbing liquid in the bottom-phase takeoff 46 is from 0.5 to 10 ppm by weight, preferably from 2 to 5 ppm by weight. In addition, the supplied scrubbing liquid amount 42 that is recirculated to the absorption column 41 is reduced to the extent that the ethylene oxide concentration in the overhead stream leaving the absorption column 41 is from 10 to 500 ppm by weight, preferably from 20 to 50 ppm by weight. By increasing the steam input 18 before entry into the refrigeration system 30, the amount of recirculated scrubbing liquid 42 may be decreased, which has the effect that, in the evaporator 48 of the desorption column 45, less steam is required. The sum of steam input 18 into the refrigeration system and steam input into the evaporator 48 is minimized by the control strategy. In addition, the steam input 18 into the refrigeration system can be correspondingly influenced directly. Indirect influence can also be provided in which, by means of the control strategy, the temperature before entry into or exit from the refrigeration system 30 is influenced. In this case, the steam input 18 is influenced in a subsidiary control loop.

The process according to the invention can also be used at another point in the EO process (which is not shown in FIG. 4). After a compression to a pressure of 18 to 24 bar, a substream of 30 to 99% of the recycle gas taken off from the absorption column 41 is fed to a $CO_2$ absorption. Generally, a solution of potassium carbonate is used as absorbent in this case. The recycle gas substream substantially freed from $CO_2$ is, after exit from the absorber, cooled and recirculated to the EO reactor. The $CO_2$-loaded potassium carbonate solution is thermally regenerated in a desorber at a temperature of 100 to 120° C. The $CO_2$ in this process is expelled from the potassium carbonate solution, saturated with steam at 1 to 2 bar. Here, again the vapor stream from the desorber at a temperature of 100 to 115° C. is passed through a first heat exchanger in the context of the present invention in order to drive a refrigeration system. The refrigeration energy obtained can likewise be used for cooling the scrubbing liquid for the absorption column 41 or alternatively used at other points in the EO process.

By using the process according to the invention in the EO production process, the economic efficiency thereof may be improved. The use of the desorber vapor streams offers advantages, in particular, for generating heat energy for an absorption refrigeration system for obtaining cold water and use thereof for cooling the scrubbing liquid for the absorber. By reducing the feed temperature of the scrubbing liquid to the absorber with a constant feed rate, the absorption of the valuable component from the recycle gas stream may be improved. Using the process according to the invention, a capacity increase of the EO absorption and desorption in an existing plant may therefore be achieved with constant demand of externally supplied heating steam.

Alternatively, owing to the improved absorption, with constant capacity, a lower rate of circulating scrubbing liquid can be provided. In particular in the planning of new plants, this leads to lower capital costs owing to smaller apparatuses and to a decrease in the operating costs owing to a smaller heating steam requirement for the regeneration of the scrubbing liquid in the EO desorber.

In other processes also, the process according to the invention may be used advantageously. Preferably, in this case, the second process stream which is removed from a desorption column and supplied to an absorption column is cooled to a temperature in the range from above 10° C. and below the available cooling water temperature. In addition, preference is given to a process in which this cooling proceeds in a multistage manner by the second process stream which is removed from the desorption column being cooled in a heat exchanger using cooling water substantially to the cooling water temperature, and then, in at least one heat exchanger which is operated using cold water from an absorption refrigeration system, being brought to a temperature in the range from above 10° C. and below the cooling water temperature.

The invention claimed is:

1. A process for heat integration in engineering processes, comprising:
   in a heat carrier circuit, using a heat carrier medium which takes up heat from a first process stream in a first heat exchanger and releases the heat to a refrigeration system; and
   in a refrigerant circuit, using a refrigerant which is cooled in the refrigeration system and the refrigerant takes up heat from a second process stream in a second heat exchanger or a second process stream which is cooled in the refrigeration system,
   wherein the first process stream is a vapor stream from a thermal separation apparatus, and the temperature of the heat carrier medium is increased by heat supply between egress from the first heat exchanger and ingress into the refrigeration system.

2. The process according to claim 1, wherein the heat is supplied via an additional heat exchanger.

3. The process according to claim 1, wherein the heat is supplied by a liquid or vaporous heating medium being fed into the heat carrier circuit.

4. The process according to claim 2, wherein the temperature of the heat carrier medium, before entry into the refrigeration system, is controlled to a preset value by influencing an output of the additional heat exchanger.

5. The process according to claim 2, wherein the temperature of the heat carrier medium, after exit from the refrigeration system, is controlled to a preset value by influencing an output of the additional heat exchanger.

6. The process according to claim 1, wherein the refrigeration system is an absorption refrigeration system.

7. The process according to claim 1, wherein the temperature of the heat carrier medium exiting from the first heat exchanger is from 80° C. to 120° C., and the subsequent temperature increase of the heat carrier medium is from 0.5° C. to 10° C.

8. The process according to claim 1, wherein the first process stream is an overhead stream from a desorption column, and the second process stream is a stream which is removed from the desorption column and supplied to an absorption column.

9. The process according to claim 8, wherein the second process stream which is removed from the desorption column and supplied to an absorption column is cooled to a temperature in the range from above 10° C. and below an available cooling water temperature.

10. The process according to claim 9, wherein the cooling proceeds in a multistage manner by the second process stream which is removed from the desorption column being cooled in a heat exchanger using cooling water substantially to the cooling water temperature, and then, in at least one heat exchanger which is operated using cold water from an absorption refrigeration system, being brought to a temperature in the range from above 10° C. and below the cooling water temperature.

11. The process according to claim 1, wherein the engineering process is a process for producing at least one of ethylene oxide or ethylene glycol.

12. The process according to claim 10, wherein the engineering process is a process for producing ethylene oxide, in the desorption column a scrubbing liquid loaded with ethylene oxide is regenerated, wherein the ethylene oxide-enriched first process stream is taken off at a top of the column, the regenerated scrubbing liquid is cooled in a multistage manner as a second process stream and recirculated to the absorption column, wherein the cooling proceeds to a temperature in the range from 15° C. to 30° C.

13. The process according to claim 12, wherein a vaporous heating medium is fed into the heat exchanger circuit, and a model-supported control, by influencing an amount of the vaporous heating medium, minimizes a sum of supplied heating medium and steam feed to the evaporator of the desorption column.

14. The process according to claim 12, wherein the cooling proceeds to a temperature in the range from 18° C. to 22° C.

15. The process according to claim 3, wherein the temperature of the heat carrier medium, before entry into the refrigeration system, is controlled to a preset value by influencing an output of the supplied amount of heating medium.

16. The process according to claim 3, wherein the temperature of the heat carrier medium, after exit from the refrigeration system, is controlled to a preset value by influencing an output of the supplied amount of heating medium.

* * * * *